Figure 1:
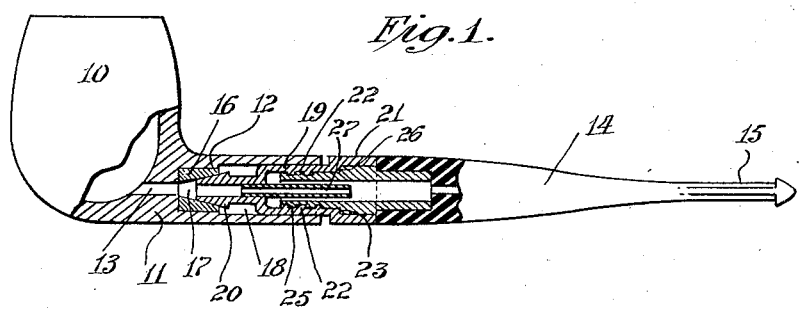

June 8, 1948.　　　D. P. LAVIETES　　　2,443,108
SMOKER'S PIPE
Filed Nov. 23, 1944

David P. Lavietes
INVENTOR
BY Frank J. Wentworth
his ATTORNEY.

Patented June 8, 1948

2,443,108

UNITED STATES PATENT OFFICE 2,443,108

SMOKER'S PIPE

David P. Lavietes, Brooklyn, N. Y.

Application November 23, 1944, Serial No. 564,759

2 Claims. (Cl. 131—225)

The invention relates to smokers' pipes and more particularly to pipes so constructed as to permit the bit or stem to be removably connected with the shank of the pipe bowl in a manner to form a tight joint between these parts and yet allow for their relative adjustment to correct any departure from a desired position of the bit relative to the bowl resulting from a lack of accuracy in, or to wear upon the parts of the attaching fittings, or for the setting of the parts of the fittings to adapt the pipe to the individual fancy of the user.

In smoking a pipe, there is always developed a certain amount of moisture, and the bowl and its shank are subjected to a wide range of temperatures. The resulting conditions are such that unless a tight joint is formed between the shank and the bit or stem, accumulated moisture will seep between the ends of these parts exteriorly of the pipe, but the joint must be formed in a manner which will permit a separation of the bit from the shank and its replacement so that the accumulated moisture or precipitate, may be moved and the openings in the parts cleaned.

Generally speaking, two practices have been followed in securing a bit or stem to the bowl shank; one the use of a "push bit" in which a tenon is formed integrally with or mounted upon the end of the bit or stem and a socket is formed in the end of the bowl shank; the other the use of a screw threaded tenon formed integrally with, or mounted upon the end of the bit, and a complementary screw threaded socket formed in the end of the shank.

While with a "push bit" it is possible to make any desired adjustment of the bowl and the bit, it is so difficult to secure a tight, non-seeping joint that a liner for the shank socket of cork or other resilient material is resorted to, but such a liner is apt to break down after a short use of a pipe following frequent removal and replacement of the bit, with a consequent loss of tightness in the fit between the tenon and the liner.

With a bit having a screw threaded connection with the shank of a pipe, a tight fit may be secured if the parts are accurately fitted although slight dimensional variations or wear upon the screw threads may result in a looseness of parts resulting in seepage of moisture or an overturning of the bit in an effort to correct this looseness. Such overturning of the bit causes a loss in the desired relative position of the bowl and the bite of the bit or stem.

To correct the above referred to difficulties encountered with a "push bit," I have heretofore produced a pipe in which the end of the shank was provided with a projecting frusto-conical tenon engageable with a complementary socket of slightly smaller diameter in the bit or stem so as to permit variable movement of the latter in finding a seat with a tight fit upon the former. This structure is disclosed in Patent No. 1,888,462, issued November 22, 1932. While such a construction permitted any desired positioning of the bit to properly adjust it in relation to the bowl of the pipe, and axial adjustment of the parts to compensate for wear or slight dimensional variations, a careless use of the pipe would cause the bowl to drop from the bit.

Furthermore, one not accustomed to a pipe so made, might fail to cause a proper tight fit between the metal parts or these parts might work loose so that the bowl might fall from the bit as described. Some users also had difficulty in cleaning the pipe.

To correct the difficulty due to overturning of a bit in a screw tenon type of pipe, I have heretofore produced a pipe in which the bit can be turned upon the screw threads of a slidable part of the tenon after a proper tight fit has been secured, a spring tensioned by this movement of the tenon part restoring and maintaining the fit between the end of the shank and the bit after such adjustment and preventing accidental relative movement of the shank and the bit. Four metal parts including a spring are required in the tenon structure of such a pipe. This structure is disclosed in Patent No. 2,003,373, issued June 4, 1935.

With the above conditions in mind, I have provided by my present invention, a smoker's pipe wherein the bit is removably secured to the bowl shank by means of a member forming a part of the tenon fitting carried by the bit or stem and a co-operating complementary member positioned well within a socket in the end of the shank so as to not only secure a tight fit or joint and a frictional engagement between the parts, but permit unrestricted turning of the bit to prevent or correct its possible overturning while securing the fit. To ensure a proper alinement of the shank and the bit, I provide the tenon with a cylindrical part engageable with the socket adjacent the end of the shank. This will also ensure an accurate centering of the tenon as a whole with the member within the shank.

The construction is such that under no circumstances can there be such relative movement of the bowl and the bit as will permit the bowl to fall from the bit and even if a friction joint is formed which is so poor as to inadequately seal the pipe against seepage of moisture past the joint, a supplemental seal is formed between the joint and the end of the shank and there will be no opportunity for moisture precipitated within the shank to seep between it and the bit, since none can pass about the fittings used in connecting the bit with the shank.

The construction of the joint forming part of the bit and the complementary portion carried within the shank are such as to permit the formation of a tight joint by a slight variable axial movement of the bit, to compensate for fouling of parts or dimensional variation of, or wear upon the parts co-operating to form the joint.

To permit the quick removal of any moisture precipitated within a well formed in the bit, the bit may be detachably connected with the joint forming part of the tenon so that it may be removed for cleaning purposes without disturbing the joint between the tenon and the shank fitting and a sufficiently tight joint may be formed between it and the tenon to prevent seepage of precipitated moisture through the joint; and any overturning of the bit when forming the joint may be corrected by adjusting the tenon in its entirety in relation to the shank.

The invention consists primarily in a smoker's pipe embodying therein a bowl provided with a shank, a fitting secured within same adjacent the bowl and having a tapered cylindrical socket with its large end presented towards the open end of said shank, a bit, and a tenon fitting or tubular member secured thereto and projecting axially therefrom having a frusto-conical head of slightly larger dimensons than those of said socket, said tenon being of a length to space the end of said bit away from the end of said shank whereby a moisture proof friction joint is formed between the socket in said shank and the head of said tenon, and said bit may be turned to adjust the relative positions of said bowl and the bite of the bit; and in such other novel features of construction and combination of parts as are hereinafter set forth and described and more particularly pointed out in the claims hereto appended.

Figure 2:
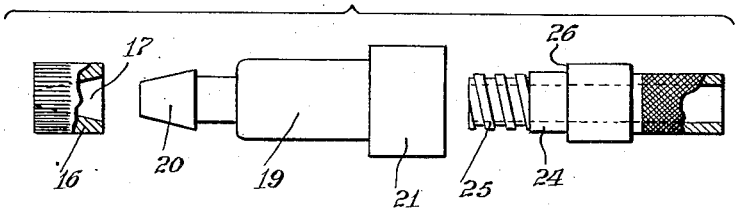

Referring to the drawings,

Fig. 1 is a side view of a smoker's pipe embodying the invention shown partly in section, and Fig. 2 is an exploded view on a larger scale of the bit tenon and co-operating socket elements.

Like numerals refer to like parts in both of said views.

In the embodiment of the invention shown in the drawings, the pipe bowl 10 and its shank 11 are made of briar root, the shank having a bore 12 and the usual smoke passage 13 communicating with the bowl. The bit or stem 14 may be made of hard vulcanized rubber, plastic or other material commonly used for the purpose. The bite 15 is flattened and ridged in the usual manner.

The bit or stem 14 is removably connected with the shank 11 by a special fitting made of a metal alloy, a plastic, or other suitable non-absorbent material. Such fittings are so formed as to not only facilitate the assembly of the pipe and the adjustment of the bit in the factory, but the removal of the bit from the shank for cleaning therefrom the precipitated moisture developed during use of the pipe and the convenient replacement of the bit after cleaning and the adjustment of the bite 15 in relation to the bowl to ensure the relative angles of the bite of the bit and the bore of the bowl according to the requirement or fancy of the user, while securing and maintaining a gas and liquid tight joint between the shank and the bit or stem and correct any departure from the desired angular relation of the bowl and the bite of the bit due to overturning of the latter when applying the bit to the shank or during the use of the pipe.

The fitting by means of which the bit or stem is secured to the bowl shank comprises a socket member 16 secured within the bore 12 of the shank 11 adjacent the bowl in a manner to prevent possible turning of the fitting, as by means of a drive fit with the bore or the use of a suitable cement. By using a cement, extreme nicety in the dimensions of the bore 12 and the member 16 is avoided, and assembly of the bit and the shank is made easier.

The end of the fitting 16 has a tapered cylindrical or truncated conical socket 17, the base of which is presented towards but spaced from, the outer end of the shank, the portion of the bore 12 of the shank 11 between the end of the socket fitting and the end of the shank being cylindrical and of larger diameter than the base of the socket 17 for a purpose to be hereinafter referred to. The cylindrical portion of the bore 12 adjacent the end of the shank 11 is indicated at 18.

Secured to an end of the bit or stem 14 is a cylindrical tenon or tubular member 19 having a close sliding fit with the portion 18 of the shank bore 12. Carried by and spaced axially from the end of the tenon 19 is a tapered cylindrical or truncated conical head 20 of slightly larger dimensions than those of the socket 17 so as to admit of slight variance in the axial movement of the bit to secure a tight friction fit between the head 20 and the wall of the socket 17 irrespective of fouling, wear or other conditions varying the dimensions of either part. The tenon 19 projects from a sleeve 21 carried by the bit 14, which sleeve is of substantially the same diameter as the shank 11 but of greater diameter than the tenon 19 thus forming a shoulder presented towards but spaced a few thousandths of an inch from the end of the shank so as to permit that slight variable axial movement of the bit necessary to secure, at all times, the required tight joint between the tenon head 20 and the socket 17. This results from the spacing of head 20 from the sleeve 21 a distance slightly greater than the distance between the base of the socket 17 and the end of the shank 11. The wall of the socket 17 and the outer face of the head 20 have the same angularity or pitch, but the greatest diameter of the head is slightly larger than that of the socket 17. By this arrangement, the head 20 with pressure alone or when accompanied by a slight turning of the bit, will find a tight seat within the socket 17 with large friction sealing areas in contact with each other.

While the fitting carrying the sleeve 21, the tenon 19 and the head 20 may be permanently secured to the bit 14 in any desired manner, I prefer to use a screw threaded tubular connection between this fitting and the bit so that the bit may be removed for cleaning the precipitate collected therein without removing the head 20 from the socket 17. This I accomplish by providing the tenon 19 with interior screw threads 22 and an adjacent stop shoulder 23, and mounting upon the end of the bit 14 a tubular extension 24 having exterior screw threads 25 and a shoulder 26 adapted to be drawn tightly against the stop shoulder 23 and the end of the bit 14 against the end of the sleeve 21 by the action of the screw threads 22 and 25.

The tube 27 within the tenon 19 is commonly used in pipes having a well in either or both the shank and the bit, to collect precipitated moisture and exclude it in large measure from the bore of the bit.

In the production of a pipe embodying the invention, the socket fitting 16 is forced onto the head 20 of the tenon to form a gas and liquid tight joint. The socket fitting is then forced into the bore 12 with the head 20 still in the socket. The cylindrical tenon enters the end portion 18 of the bore 12 accurately centering the member or fitting 16 and the tenon in relation to each other and the shank 11. If cement is used, it is applied to the fitting 16 before the latter is forced into the shank bore 12. Incidentally, the outer wall of the fitting 16 is ridged or knurled to secure such a grip against the wall of the bore 12 as will preclude any turning of the fitting 16 within the bore.

Thereafter, when replacing a bit carrying the tenon 19, there always will be a proper axial alinement of the bit and the shank irrespective of the angular relation of the bowl 10 and the bite 15. In this manner a definite relation of parts is established when assembling a pipe, which will not be disturbed by the turning of the bit to secure a desired angular relation of these parts in correcting a misplacing of the bit when applying it to the shank or to correct overturning of the bit when forming a tight joint either between the head 20 and the socket 17 or between the bit 14 and the tenon 19 when a screw threaded connection between these parts is used and when wear occurs on the screw threads.

In a pipe embodying the invention, a gas and liquid tight seal is formed between the socket 17 and the head 20 of the tenon carried by the bit. In the event of a loss of this seal from fouling of contacting surfaces or wear of parts, the head 20 may be axially adjusted to so position the head 20 in the socket 17 as to form a tight seal irrespective of such dimensional variation as would preclude an effective seal if such adjustment were not resorted to. Such axial adjustment whether with or without, but preferably with, the turning of the bit is made possible by reason of the narrow gap between the sleeve 21 and the end of the shank 11.

If in making the adjustment, the bit should be so turned as to bring the flattened portion of the bit adjacent the bite 15 to a position to cause a tilting of the bowl while the pipe is in use, known as "overturning" of the bit, this condition can be corrected by turning of the bit without axial movement and without breaking the seal between the socket 17 and the tenon head 20. There is no restriction on the amount of turning movement of the bit.

If through carelessness, a tight fit between the socket 17 and the head 20 should not be secured, the tenon 19 by engagement with the wall of the socket 12, in addition to its centering and aligning functions, will also form a secondary seal against seepage of precipitate from the shank 11.

By using a screw threaded connection between the bit 14 and the tenon 19 when a well is provided for the accumulation of precipitated moisture, the bit may be removed from the tenon and such moisture removed from the well by shaking the bit. The shoulder 26 abuts against the stop shoulder 23 and forms a seal preventing the precipitate from collecting within the sleeve 21 where it can seep between the abutting portions of the sleeve and the bit. The screw threaded connection permits a tight seal between the sleeve and the bit irrespective of the efficiency of the seal between the socket 17 and the head 20.

When applying the bit to the socket 17, the torque developed after the end of the bit abuts against the sleeve, may result in overturning of the bit, but this may be corrected by continued turning of the bit.

While adjustment of the bit may be made to bring the flattened portion adjacent the bite of the bit to a position at right angles to the vertical axis of the bowl 10, such adjustment may be used to bring the axis of the bowl to a vertical position when the habits or tooth formation of the user requires the bite to have a slight tilt from the horizontal.

It is not my intention to limit the invention to the particular materials used nor to the precise details of construction shown in the drawings, since it is apparent that such may be varied without departing from the spirit and scope of the invention.

Having described the invention, what I claim and desire to have protected by Letters Patent is:

1. A pipe having a bowl with a shank having a recess therein, a bit having a recess and means of connection between the shank and bit for detachably connecting the bit to the shank, for providing a seal between the shank and bit and for adjusting the relative positions of the bowl and bite of the bit, consisting of a fitting in the recess of the shank having a tapered seat, a screw-threaded tenon member seated in the recess in the bit and extending outwardly of said bit, and a removable internally screw-threaded tubular member interposed between said shank and bit and adapted to receive said tenon member, said tubular member having a cylindrical portion for frictionally engaging the recess in the shank, an enlarged cylindrical portion at one end of said cylindrical portion of substantially the same diameter as the shank and bit, and a tapered head extending from the other end of said cylindrical portion coacting with the tapered seat in the fitting in the shank, the length of the tubular member from the head to the enlarged cylindrical portion being greater than the distance from the seat in the fitting to the other end of the shank.

2. A pipe having a bowl with a shank having a recess therein, a bit having a recess and means of connection between the shank and bit for detachably connecting the bit to the shank, for providing a seal between the shank and bit and for adjusting the relative positions of the bowl and bite of the bit, consisting of a fitting in the recess of the shank having a tapered seat, a secrew-threaded tenon member seated in the recess in the bit and extending outwardly of said bit, and a removable internally screw-threaded tubular member interposed between said shank and bit and adapted to receive said tenon member, said tubular member having a cylindrical portion for frictionally engaging the recess in the shank providing a seal thereat, an enlarged cylindrical portion at one end of said cylindrical portion of substantially the same diameter as the shank and bit and interposed therebetween, and a tapered head extending from the other end of said cylindrical portion coacting with the tapered seat in the fitting in the shank providing a seal thereat, the length of the tubular member from the head to the enlarged cylindrical portion being greater than the distance from the seat in the fitting to the outer end of the shank, said tubular member and said tenon member having abutting shoulders for limiting the insertion of the tenon member into the tubular member.

DAVID P. LAVIETES.

REFERENCES CITED

The following references are of record in the file of this patent:

UNITED STATES PATENTS

| Number | Name | Date |
|---|---|---|
| 1,888,462 | Lavietes | Nov. 22, 1932 |
| 2,326,658 | Koenigsamen | Aug. 10, 1943 |

FOREIGN PATENTS

| Number | Country | Date |
|---|---|---|
| 15,523 | Great Britain | Oct. 3, 1912 |